Feb. 9, 1971  D. J. CUNNINGHAM  3,561,848
REAR VIEW MIRRORS FOR VEHICLES

Filed Nov. 26, 1968  3 Sheets-Sheet 1

Feb. 9, 1971   D. J. CUNNINGHAM   3,561,848
REAR VIEW MIRRORS FOR VEHICLES
Filed Nov. 26, 1968   3 Sheets-Sheet 3
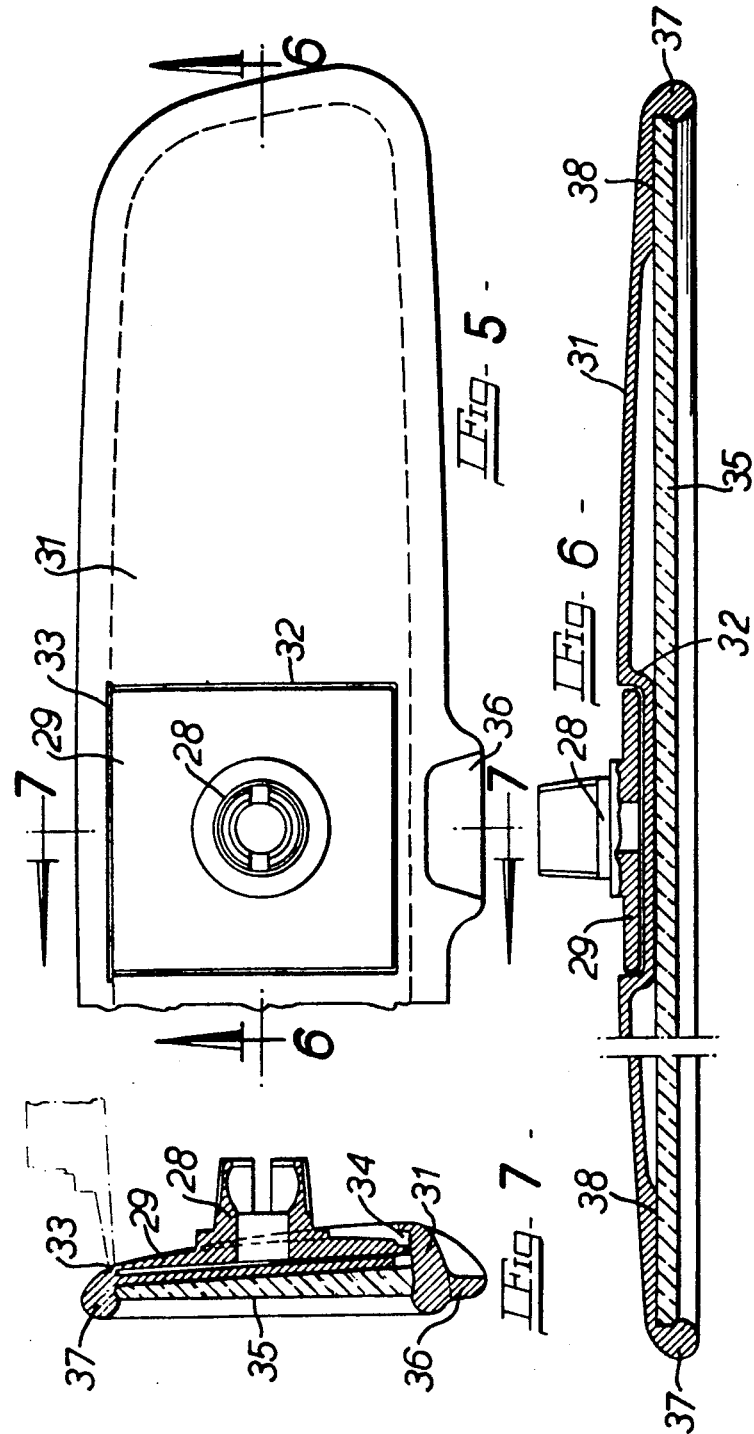

# United States Patent Office 3,561,848
Patented Feb. 9, 1971

3,561,848
REAR VIEW MIRRORS FOR VEHICLES
Douglas J. Cunningham, Chichester, England, assignor to Wingard Limited, Chichester, England, a British company
Filed Nov. 26, 1968, Ser. No. 778,996
Claims priority, application Great Britain, Jan. 23, 1968, 3,501/68
Int. Cl. G02b 5/08
U.S. Cl. 350—281                                    3 Claims

ABSTRACT OF THE DISCLOSURE

In a rear-view mirror for vehicles incorporating a mirror element having two surfaces of different reflecting powers arranged at a small angle to each other within a case and means for bringing either surface at will into an operative position, the case is moulded in one piece from plastic and front and back parts of the case respectively carrying the mirror element and means for mounting the mirror on a support are articulated together along at least one line formed by reducing the thickness of the plastic.

---

This invention relates to rear view mirrors for vehicles of the kind in which a mirror element mounted in a case or housing incorporates two surfaces of different reflecting powers arranged at a small angle to each other and either surface can be brought at will into an operative position. Normally the reflecting surface of higher power is operative, but if the driver of the vehicle is dazzled by the reflection in the mirror of the lights of a vehicle behind he can bring the surface of lower reflective power into operation.

Hitherto the mirror element or a frame carrying it has usually been mounted to rock about its top or bottom edge in a rigid case or housing carried by a supporting arm, means being incorporated for moving the element angularly and locating it in each of its two operative positions.

According to our invention, in a rear view mirror of the kind set forth the case or housing is a one-piece plastic moulding of which the front part, in which the mirror element is mounted, and the back part, which carries means for mounting it on a supporting arm or the like, are connected or articulated to each other along one or more lines formed by reducing the thickness of the plastic whereby the front part carrying the mirror element can be moved angularly into each of two positions relative to the back part.

The angular spacing between these two positions is the same as the angle between the two reflecting surfaces of the mirror element so that either surface can be brought into an operative position by simply rocking the front part of the case in which the element is mounted relative to the part carried by the supporting arm.

Two embodiments of our invention are illustrated by way of example in the accompanying drawings in which.

Figure 1:
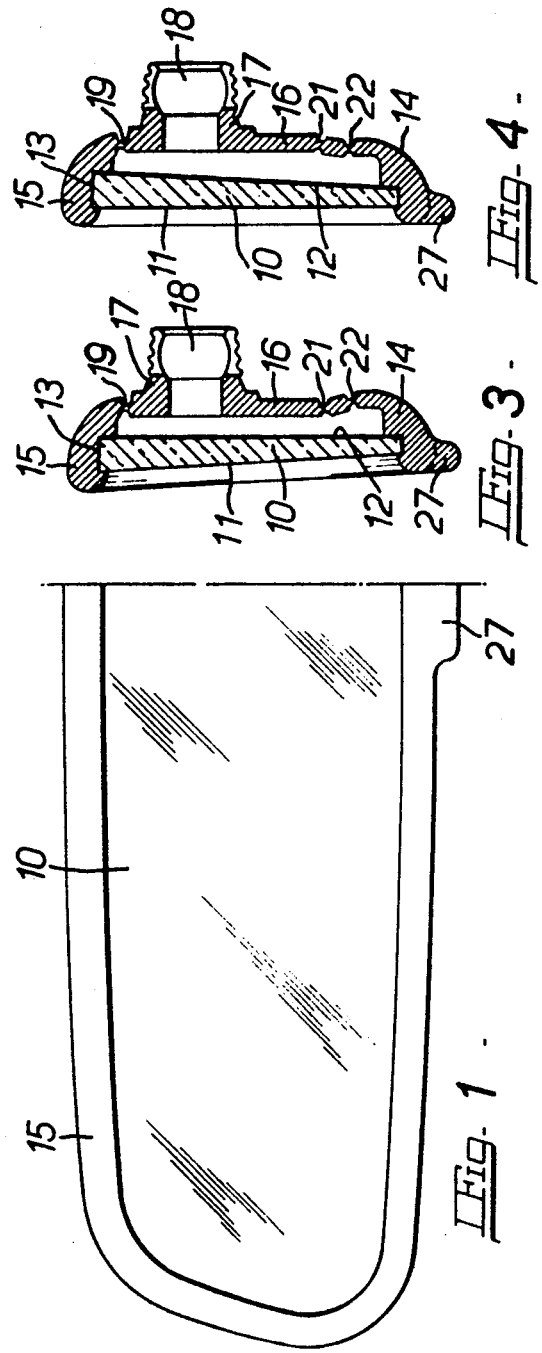
FIG. 1 is a front elevation of one half of a rear view mirror.
Figure 2:
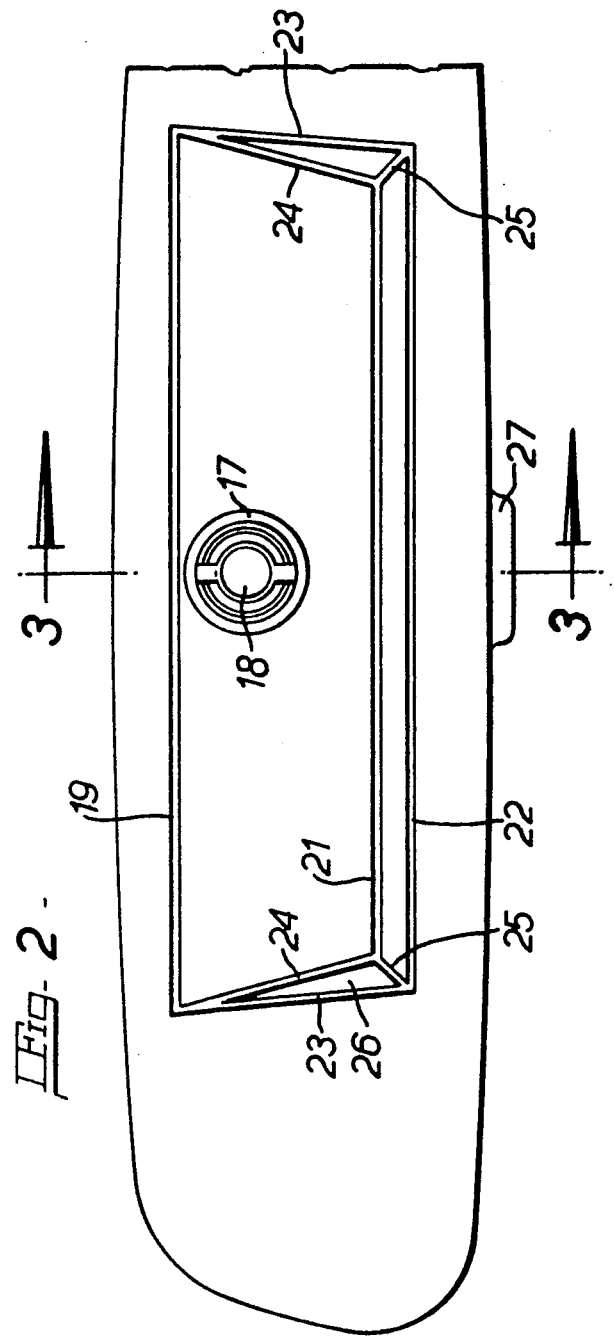
FIG. 2 is a rear elevation of the mirror.

FIG. 3 is a vertical section on the line 3—3 of FIG. 2 showing the mirror front in one operative position, FIG. 4 is a similar section showing the mirror front in its other operative position, FIG. 5 is a rear elevation of a modified form of rear view mirror, FIG. 6 is a horizontal section on the line 6—6 of FIG. 5, and FIG. 7 is a vertical section on the line 7—7 of FIG. 5.

Both mirrors illustrated are internal rear view mirrors of the known kind set forth in the opening paragraph of this specification.

In the mirror illustrated in FIGS. 1 to 4 the mirror element 10 is a wedge-shaped member having a front surface 11 of relatively low reflective power and a silvered or other rear surface 12 of high reflective power. The mirror element is mounted with its thicker edge uppermost in a continuous groove or recess 13 in a case 14. The groove or recess which receives the peripheral edge of the mirror element is formed in the inner surface of a forwardly extending flange 15 on the case.

The case is moulded in one piece from polypropylene or other synthetic plastic material having similar physical properties. It incorporates a substantially flat back 16 from which the peripheral flange 15 extends forwardly. At an intermediate point in the depth the back has an integral rearwardly extending boss 17 in which is formed a part-spherical socket 18 to receive a ball end on a mounting arm (not shown). The periphery of the boss is screw-threaded as shown to receive a flanged nut by which the boss is tightened on to the ball after attachment of the mirror.

Above the boss 17 the thickness of the back is reduced along a line 19 which is substantially horizontal when the mirror is mounted in a vehicle. Below the boss the thickness of the back is reduced along two lines 21, 22 spaced a short distance apart in a vertical direction and parallel to the first line 19. A substantially vertical line 23 of reduced thickness extends from each end of the first line to the corresponding end of the lower line 22 of the bottom pair, and a second line 24 of reduced thickness inclined inwardly at a small angle to the vertical extends from each end of the first horizontal line 19 to the corresponding end of the upper line 21 of the bottom pair which is slightly shorter than the lower line 22. The line 24 is continued downwardly by an outwardly inclined short portion 25 to meet the end of the lower line 22. This leaves a narrow triangular part 26 of full thickness at each end of the horizontal lines. The lines form spaced hinges of which the lower one is a double hinge, and the front part of the case carrying the mirror element can be rocked about the top line 19 while the part of the back of full thickness between the two lower lines rocks over from one side to the other of the plane of the stationary part of the back carried by the mounting arm and will remain in each of these positions until moved manually into the other position.

FIG. 3 shows the mirror element in the position in which the rear surface 12 of the glass is operative and FIG. 4 shows it in the position in which the front surface 11 is operative.

The angular movement of the front part of the case carrying the mirror element between these two positions can readily be arranged to be equal to the angle between the two reflecting surfaces of the mirror element so that either surface can be brought into the operative position by simply rocking the front part of the case backwardly or forwardly. A downwardly projecting finger piece 27 for manipulating the front part of the case is conveniently provided in the centre of its lower edge.

It will be appreciated that the case is moulded with the two parts in one or other of their limiting positions to provide the in-built forces necessary to urge the parts resiliently into each operative position after passing over dead-centre in changing from one position to the other.

If desired adjustable screw or other stops (not shown) may be provided to locate the front part of the case accurately in each of its limiting positions, and a spring or springs may be incorporated to assist in the "over-centre" movement of the front part of the case relative to the fixed part of the back.

In the above description we have referred to the hinges being formed by lines of reduced thickness. Each line is conveniently formed by moulding aligned grooves of semi-cylindrical cross-section in opposite faces of the back, the thickness of the material left between the inner parts of the grooves being such as to provide the required flexibility.

In a modification the vertical and inclined lines of reduced thickness connecting the ends of the horizontal lines may be omitted and replaced by slits extending through the thickness of the back and connecting the ends of all three lines which are then all of equal length.

That construction would give the same result but would not be so strong as the construction described above which is the preferred form.

In the modified construction shown in FIGS. 5 to 7 a socket 28 adapted to receive a ball end on a mounting arm projects rearwardly from a substantially rigid rectangular back member or panel 29. The main part 31 of the case has a recess 32 in its rear face to receive the panel which is moulded integrally with the main part of the case. The upper edge of the panel is attached to the main part of the case by a hinge formed by reducing the thickness of the plastic along a line 33 which will be substantially horizontal when the mirror is mounted in a vehicle.

The lower end of the panel is free and is adapted to slide in a fore-and-aft direction in a groove 34 in the lower portion of the main part 31 of the case. The width of the groove in a fore-and-aft direction is such as to define an angular movement of the main part of the case about the line 33 and relative to the panel 29 equal to the angular spacing between the two reflecting surfaces of the mirror element 35. A downwardly projecting finger-piece 36 is formed on the lower edge of the main part for moving it angularly relative to the panel 29.

The main part of the case incorporates a forwardly extending peripheral flange 37 grooved on its inner face to receive the mirror element and a flat seating 38 for the mirror element on the inner side of the peripheral flange.

The moulding operation is carried out with the two parts of the case spread out or at least clear of each other except along the connecting hinge line 33 of reduced thickness, and on assembly the back part or panel 29 is folded down so that its free lower edge snaps into the groove 34 at the bottom of the front or main part.

In both the mirrors illustrated the mirror element is a wedge-shaped glass member having its front and rear faces inclined to each other at an appropriate angle. An element of that form may be replaced by an assembly incorporating two separate sheets of glass inclined to each other.

I claim:

1. A rear-view mirror for vehicles incorporating a mirror element having two surfaces of different reflecting powers arranged at a small angle to each other within a case and means for bringing either surface at will into an operative position, wherein the improvement comprises a case moulded in one piece from plastic and incorporating a front part of the case in which the mirror element is mounted and a back part carrying means for mounting the mirror on a support, said mounting means being located at an intermediate point in the depth of the back part of the case, said back part being connected to the front part by a single line of reduced thickness which is located above the mounting means and is substantially horizontal when the mirror is mounted in a vehicle and by a bottom pair of parallel lines of reduced thickness below the mounting means and spaced only a short distance apart, the section of said casing between said pair of parallel lines being inclined with respect to the back part between the upper of said pair of lines and said single line, thereby providing in-built forces necessary to urge the parts resiliently into each operative position after passing over dead center in changing from one position to the other.

2. A rear-view mirror as in claim 1 wherein each end of said single line is connected by a substantially vertical line of reduced thickness to the adjacent end of the lower line of said bottom pair of lines which is of greater length than the upper line, and by an inwardly inclined line to the adjacent end of the upper line of the bottom pair which is connected by an outwardly inclined line to the end of the lower line.

3. A rear-view mirror as in claim 1 wherein said single line and said pair of parallel lines are of equal length and their adjacent ends are connected by substantially vertical slits extending through the thickness of the back part of the case.

References Cited

UNITED STATES PATENTS

| 2,910,915 | 11/1959 | Harris | 350—280 |
| 3,427,095 | 2/1969 | Dykema et al. | 350—281X |
| 3,253,510 | 5/1966 | Clayton | 350—281 |

FOREIGN PATENTS

| 1,237,454 | 3/1967 | Germany | 350—281 |

JOHN K. CORBIN, Primary Examiner